United States Patent
Singh et al.

(10) Patent No.: US 10,662,372 B2
(45) Date of Patent: May 26, 2020

(54) MULTIFUNCTIONAL BRUSH PHOTOPOLYMERIZED COATED PROPPANT PARTICULATES USE IN SUBTERRANEAN FORMATION OPERATIONS

(71) Applicant: Halliburton Energy Services, Inc., Houston, TX (US)

(72) Inventors: Dipti Singh, Kingwood, TX (US); Prashant D. Chopade, Kingwood, TX (US); Janette Cortez, Kingwood, TX (US); Philip D. Nguyen, Houston, TX (US); Ronald Glen Dusterhoft, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/758,718

(22) PCT Filed: Oct. 22, 2015

(86) PCT No.: PCT/US2015/056936
§ 371 (c)(1),
(2) Date: Mar. 8, 2018

(87) PCT Pub. No.: WO2017/069763
PCT Pub. Date: Apr. 27, 2017

(65) Prior Publication Data
US 2018/0273836 A1    Sep. 27, 2018

(51) Int. Cl.
*C09K 8/80* (2006.01)
*C09K 8/92* (2006.01)
(Continued)

(52) U.S. Cl.
CPC ............ *C09K 8/805* (2013.01); *C09K 8/68* (2013.01); *C09K 8/70* (2013.01); *C09K 8/882* (2013.01);
(Continued)

(58) Field of Classification Search
CPC . C09K 8/80; C09K 8/805; C09K 8/68; C09K 8/70; C09K 8/882; C09K 8/887; C09K 8/92; E21B 43/26; E21B 43/267
See application file for complete search history.

(56) References Cited

U.S. PATENT DOCUMENTS 3,232,916 A   2/1966 Fogle
4,559,186 A   12/1985 Lee
(Continued)

FOREIGN PATENT DOCUMENTS

WO   WO-2013033391 A1   3/2013
WO   WO-2015130276 A1   9/2015
WO   WO-2015195107 A1   12/2015

OTHER PUBLICATIONS

Chen et al., "Well-defined PMMA brush on silica particles fabricated by surface-initiated photopolymerization (SIPP)," ACS Applied Materials & Interfaces, 2010, col. 2, No. 4, pp. 1031-1037.
(Continued)

*Primary Examiner* — Crystal J Miller
(74) *Attorney, Agent, or Firm* — McGuireWoods, LLP (57) ABSTRACT

Methods including introducing a treatment fluid into a subterranean formation having at least one fracture therein, the treatment fluid comprising an aqueous base fluid and brush photopolymerized coated proppant particulates (bPCPPs), and placing the bPCPPs into the at least one fracture to form a proppant pack therein. The bPCPPs comprise proppant modified with a coupling agent photopolymerized to a derivatized hydrophilic polymer, thereby resulting in a
(Continued)

brush polymer structure of the derivatized hydrophilic polymer extending from the proppant.

10 Claims, 6 Drawing Sheets (51) Int. Cl.
C09K 8/88 (2006.01)
C09K 8/68 (2006.01)
C09K 8/70 (2006.01)
E21B 43/267 (2006.01)

(52) U.S. Cl.
CPC ............... *C09K 8/887* (2013.01); *C09K 8/92* (2013.01); *E21B 43/267* (2013.01)

(56) References Cited

U.S. PATENT DOCUMENTS

| 4,985,340 | A | 1/1991 | Palazzotto et al. |
| 9,027,648 | B2 | 5/2015 | Sanders et al. |
| 2010/0249273 | A1* | 9/2010 | Scales .................. C08L 33/04 523/210 |
| 2014/0014348 | A1* | 1/2014 | Mahoney ............... C09K 8/805 166/308.2 |
| 2014/0144631 | A1 | 5/2014 | Weaver et al. |
| 2014/0178324 | A1* | 6/2014 | Martinez-Castro ..... E21B 43/26 424/70.16 |
| 2014/0262203 | A1 | 9/2014 | Pamukcu et al. |
| 2014/0262294 | A1 | 9/2014 | Sanders et al. |

OTHER PUBLICATIONS

Duner et al., "Surface-confined photopolymerizatrion of pH-responsive acrylamide/acrylate brushes on polymer thin films," Langmuir, 2008, vol. 24, No. 14, pp. 7559-7564.

Schmaljohann, "Thermo- and pH-responsive polypers in drug delivery," Advanced Drug Delivery Reviews, 2006, vol. 58, pp. 1655-1670.

International Search Report and Written Opinion from PCT/US2015/056936, dated May 13, 2016, 7 pages.

* cited by examiner

MULTIFUNCTIONAL BRUSH PHOTOPOLYMERIZED COATED PROPPANT PARTICULATES USE IN SUBTERRANEAN FORMATION OPERATIONS

BACKGROUND

The embodiments herein relate to subterranean formation operations and, more specifically, multifunctional brush photopolymerized coated proppant particulates (bPCPPs) for use in subterranean formation operations.

Hydrocarbon producing wells (e.g., oil producing wells, gas producing wells, and the like) are created and stimulated using various treatment fluids introduced into the wells to perform a number of subterranean formation operations. The general term "treatment fluid," as used herein, refers generally to any fluid that may be used in a subterranean application in conjunction with a desired function and/or for a desired purpose. The term "treatment fluid" does not imply any particular action by the fluid or any component thereof.

Stimulation of hydrocarbon producing wells often involves introducing a fracturing treatment fluid, sometimes called a carrier treatment fluid when particulates entrained therein. The fracturing treatment fluid is pumped into a portion of a subterranean formation (which may also be referred to herein simply as a "formation") above a fracture gradient sufficient to break down the formation and create one or more fractures therein. As used herein, the term "fracture gradient" refers to a pressure necessary to create or enhance at least one fracture in a subterranean formation. Continuing to pump fluid will result in dilation and propagation of the fracture deep into the formation.

Typically, particulate solids are suspended in a portion of one or more treatment fluids and then deposited into the fractures deep within the formation. The particulate solids, known as "proppant particulates" or simply "proppant" serve to prevent the fractures from fully closing once the hydraulic pressure is removed. By keeping the fractures from fully closing, the proppant particulates form a proppant pack having interstitial spaces that act as conductive paths through which fluids produced from the formation may flow. As used herein, the term "proppant pack" refers to a collection of proppant particulates in a fracture, thereby forming a "propped fracture."

During recovery of produced fluids from a subterranean formation, proppant may be dislodged from the proppant pack and flow-back to the surface with the produced fluids. Such proppant flow-back can result in reduced integrity of the proppant pack and/or plugging of interstitial spaces within the proppant pack, both capable of choking flow paths and decreasing well production. Furthermore, proppant flow-back can result in plugging or abrasion of pumping or other downhole or surface equipment, require costly cleaning operations to remove the proppant from produced fluids, and the like. To prevent or reduce proppant flow-back, as well as flow-back of loose or unconsolidated formation fines, with produced fluids, proppant has been treated with a traditional consolidation system. Consolidation systems generally involve coating the surface of proppant with a resin that, when cured, prevents or minimizes proppant flow-back and also reinforces or strengthens the proppant pack.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate to subterranean formation operations and, more specifically, multifunctional brush photopolymerized coated proppant particulates (bPCPPs) for use in subterranean formation operations.

The embodiments herein provide an environmentally friendly alternate consolidation system using multifunctional brush polymer coatings that are photopolymerized onto proppant for use in controlling flow-back during a subterranean formation operation (e.g., during production). These bPCPPs additionally are able to provide other functionalities desirable during such operations including, but not limited to, enhanced suspension (e.g., due to hydrophilic qualities), including enhanced suspension independent of fluid viscosity, degradable polymer incorporation for enhancing proppant pack porosity, cationic end group incorporation for fracture face stabilization, and enhanced bridging capabilities using multimodal particle size distributions. Furthermore, the coatings described herein for forming the bPCPPs can be applied to any size or size distribution of proppant and leave relatively reduced residue on equipment that is easier to clean and remove, which simplifies equipment maintenance requirements.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

When "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses+/−5% of a numerical value. Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

In some embodiments, the present disclosure provides a method comprising introducing a treatment fluid into a subterranean formation. The subterranean formation having at least one fracture therein may have been previously formed or formed using the treatment fluid described herein by introducing the treatment fluid at a rate and pressure above the fracture gradient. The treatment fluid comprises an aqueous base fluid and bPCPPs. The bPCPPs comprise proppant, as defined herein, coated with a coupling agent and then having a derivatized hydrophilic polymer photopolymerized to the coupling agent. Accordingly, the bPCPPs have the brush polymer structure of the derivatized polymer extending from the proppant. As used herein, the term "brush polymer," and grammatical variants thereof, refers to a layered structure of polymers attached with one end to a surface (e.g., the surface of the proppant of the present disclosure). As used herein, the term "brush polymer" encompasses star polymers, dendrimers, graft polymers, and the like. The bPCPPs are then placed within the at least one fracture in the subterranean formation to form a proppant pack therein. The term "derivatized hydrophilic polymer," and grammatical variants thereof, refers to polymeric material that exhibits the ability to swell and retain a significant fraction of water within its structure. The derivatized hydrophilic polymers impart a hydrophilic surface property to the bPCPPs, which beneficially allows aqueous treatment fluids to be used which are more environmentally friendly.

The bPCPPs may be included in the treatment fluid in any amount suitable for performing a particular subterranean formation, such as forming the proppant pack in the at least one fracture. In some embodiments, the bPCPPs are included in the treatment fluids of the present disclosure in an amount of from about 0.1% to about 100% by weight of the proppant that has been modified to form the bPCPPs, encompassing any value and subset therebetween. For example, the bPCPPs may in the treatment fluids from about 0.1% to about 1%, or about 1% to about 10%, or about 10% to about 20%, or about 20% to about 40%, or about 40% to about 60%, or about 60% to about 80%, or about 80% to about 100%, or about 10% to about 90%, or about 20% to about 80%, or about 30% to about 70%, or about 40% to about 60% by weight of the proppant that has been modified to form the bPCPPs, encompassing any value and subset therebetween. One pound per gallon is equivalent to 0.1198 kilograms per liter. Each of these values is critical to the embodiments of the present disclosure and depend on a number of factors including, but not limited to, the type of subterranean formation, the size of the fracture into which the bPCPPs proppant pack is to be formed, the size and shape of the bPCPPs, the composition of the bPCPPs, and the like, and any combination thereof.

As used herein, the term "proppant" will specifically refer to material capable of propping open a fracture in a subterranean formation that is composed of a silicate material, a ceramic material, a bauxite material, and any combination thereof. Such silicate materials include, but are not limited to, natural sand material, borosilicate glass material, a neosilicate material, a sorosilicate material, a tectosilicate material (e.g., aluminosilicate), an orthosilicate material, a cyclosilicate material, an inosilicate material, a phyllosilicate material, and any combination thereof.

The proppant used for forming the bPCPPs described herein may be of any shape or size, without departing from the scope of the present disclosure. For example, shape of the proppant particulates may be such that it is substantially spherical or substantially non-spherical, which may be cubic, polygonal, fibrous, or any other non-spherical shape. As used herein, the term "substantially spherical" refers to a material that has a morphology that includes spherical geometry and elliptic geometry, including oblong spheres, ovoids, ellipsoids, capsules, and the like and may have surface irregularities. Such substantially non-spherical proppant particulates may be, for example, cubic-shaped, rectangular-shaped, rod-shaped, ellipse-shaped, cone-shaped, pyramid-shaped, cylinder-shaped, platelet-shaped, fiber-shaped, and any combination thereof. That is, in embodiments wherein the proppant particulates are substantially non-spherical, the aspect ratio of the material may range such that the material is fibrous to such that it is cubic, octagonal, or any other configuration. Each of these shapes is critical to the embodiments of the present disclosure and depends on a number of factors including, but not limited to, the type of subterranean formation, the size and shape of the fracture into which the bPCPPs proppant pack is to be formed, the silicate material selected for forming the bPCPPs, and the like, and any combination thereof.

In some embodiments, the proppant has a unit mesh size in the range of about 0.1 micrometers ($\mu m$) to about 2000 $\mu m$, encompassing any value and subset therebetween. For example, the proppant may have a unit mesh size of about 0.1 $\mu m$ to about 1 $\mu m$, or about 1 $\mu m$ to about 100 $\mu m$, or about 100 $\mu m$ to about 400 $\mu m$, or about 400 $\mu m$ to about 800 $\mu m$, or about 800 $\mu m$ to about 1200 $\mu m$, or about 1200 $\mu m$ to about 1600 $\mu m$, or about 1600 $\mu m$ to about 2000 $\mu m$, or about 400 $\mu m$ to about 1600 $\mu m$, or about 800 $\mu m$ to about 1200 $\mu m$, encompassing any value and subset therebetween. As used herein, the term "unit mesh size" refers to a size of an object (e.g., a particulate) that is able to pass through a square area having each side thereof equal to a specified numerical value. Each of these values is critical to the embodiments of the present disclosure and depends on a number of factors including, but not limited to, the type of subterranean formation, the size and shape of the fracture into which the bPCPPs proppant pack is to be formed, the silicate material selected for forming the bPCPPs, and the like, and any combination thereof.

The proppant are coated with the multifunctional brush polymers described herein either one-the-fly or prior to reaching the formation site (e.g., at an offsite laboratory location) using photopolymerization. As used herein, the term "on-the-fly" refers to performing an operation during a subterranean treatment that does not require stopping normal operations. The term "photopolymerization," and grammatical variants thereof (e.g., "photopolymerized"), refers to a polymerization reaction that is induced by electromagnetic radiation (e.g., ultraviolet or visible light).

The proppant is first modified with a coupling agent that acts as a connector ("coupler") between the proppant particulate and the derivatized hydrophilic polymer to be photopolymerized onto the proppant via the coupling agent to form the bPCPPs. As used herein, the term "coupling agent," and grammatical variants thereof, means a compound that provides a chemical bond between two dissimilar materials. Suitable coupling agents are thus chemically photopolymerizably compatible with both the proppant surface and the selected derivatized hydrophilic polymer. In some embodiments, the coupling agent is a silane coupling agent, a coupling agent comprising at least one quaternary amine group coupling agent, or a combination thereof.

Silane coupling agents have functional groups capable of reacting with the surface of the proppant (e.g., hydroxyl groups on the proppant surface), thereby coupling the saline coupling agent to the proppant (e.g., by hydrolytic deposition). For example, in one embodiment, the silane coupling agent may comprise a Si(OMe)$_3$ functional group, which may react with hydroxyl groups on the surface of the proppant, thereby displacing and eliminating methanol and forming the covalent siloxane bond Si—O—Si.

The silane coupling agents described herein have the general formula: (R)$_3$SiCH$_2$CH$_2$CH$_2$—X, where R is a hydrolyzable group and X is an organofunctional group. Suitable examples of a hydrolyzable group R include, but are not limited to, an alkoxy moiety; a methoxy moiety; an ethoxy moiety; an acyloxy moiety; an amine moiety; a hydroxyl moiety; a halo moiety; an acetoxy moiety; a propoxy moiety; a butoxy moiety; a phenoxy moiety; a chloride moiety; a bromide moiety; an iodide moiety; a pentoxy moiety; and any combination thereof. Suitable examples of an organofunctional group X include, but are not limited to, an amino moiety; a methacryloxy moiety; an epoxy moiety; alkyl moiety; an ethyl moiety; a methyl moiety; a propyl moiety; a butyl moiety; a hexyl moiety; an octyl moiety; a benzyl moiety; a cyclohexyl moiety; and any combination thereof.

Specific examples of silane coupling agents that may be used to form the bPCPPs of the present disclosure include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilane; aminoethyl-N-beta-(aminoethyl)-gamma-aminopropyl-trimethoxysilane; gamma-ureidopropyl-triethoxysilane; beta-(3-4 epoxy-cyclohexyl)-ethyl-trimethoxysilane; gamma-glycidoxypropyl-trimethoxysilane; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltris (beta-methoxyethoxy) silane; r-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-[3-(trimethoxysilyl)propyl]-ethylenediamine; and any combination thereof.

In some embodiments, the coupling agent for use in forming the bPCPPs described herein comprise at least one quaternary amine group. The one or more quaternary amine group(s) can impart clay stabilization to a formation into which the bPCPPs are introduced. As used herein, the term "clay stabilization," and grammatical variants thereof (e.g., "clay stabilizer") refers to a treatment to prevent the migration or swelling of clay particles in contact with an aqueous fluid (e.g., the aqueous base fluid in the treatment fluids described herein). The quaternary amine groups can impart clay stabilization to the face of a formation contacted by the bPCPPs and/or a fracture into which the bPCPPs are placed. A quaternary amine group has the general formula according to Formula I:

Formula I where R$^1$, R$^2$, R$^3$, and R$^4$ are a hydrogen atom, an alkyl group, an aryl group, and any combination thereof, and A is an anion. In some embodiments, the coupling agent for use in forming the bPCPPs is a silane coupling agent comprising at least one quaternary amine group.

Examples of coupling agents comprising at least one quaternary amine group include, but are not limited to, any silane coupling agent comprising at least one quaternary amine group. Examples of quaternary amine group containing polymers include, but are not limited to, polyethylenimine, polydimethylaminoethyl methacrylate, polylysine, cationic cellulose, cationic chitosan, cationic gelatin, cationic cyclodextrin, and the like, and any combination thereof. The cationic polymers listed above are further degradable.

The coupling agent may be included in any amount suitable for forming the bPCPPs described herein. In some embodiments, the coupling agent is included in an amount of about 0.1% to about 100% by weight of the proppant that has been modified to form the bPCPPs, encompassing any value and subset therebetween. For example, the coupling agent may be present in an amount of from about 0.1% to about 1%, or about 1% to about 10%, or about 10% to about 20%, or about 20% to about 40%, or about 40% to about 60%, or about 60% to about 80%, or about 80% to about 100%, or about 10% to about 90%, or about 20% to about 80%, or about 30% to about 70%, or about 40% to about 60% by weight of the proppant that has been modified to form the bPCPPs, encompassing any value and subset therebetween. Each of these values is critical to the embodiments described herein and depends on a number of factors including, but not limited to, the type of proppant selected, the type of coupling agent selected, the type of derivatized hydrophilic polymer selected, the desired functionality of the bPCPPs, and the like, and any combination thereof.

The derivatized hydrophilic polymer for use in forming the bPCPPs is one or more of a degradable derivatized hydrophilic polymer, a non-degradable derivatized hydrophilic polymer, and/or a swellable derivatized hydrophilic polymer. The derivatized hydrophilic polymer may be selected to be water-soluble, thereby increasing the environmentally friendly aspect of the bPCPPs described herein. The particular derivatized hydrophilic polymer can be selected to achieve a desired result for a given subterranean formation operation. For example, and as will be discussed in greater detail below, the degradable derivatized hydrophilic polymer may be selected to increase the porosity of the proppant pack formed using the bPCPPs after the degradable derivatized hydrophilic polymer is allowed to degrade and form conductive channels therethrough. The degradation may be either by natural wellbore conditions (e.g., temperature, salinity, hydrocarbon contact, and the like) or by an introduced stimulus. In other embodiments, the swellable derivatized hydrophilic polymer can be selected to enhance the integrity of the proppant pack formed using the bPCPPs. In some embodiments, the swellable derivatized hydrophilic polymer may de-swell during hydrocarbon production to increase conductivity of the proppant pack, without departing from the scope of the present disclosure.

Examples of suitable derivatized hydrophilic polymers for use in the embodiments described herein include, but are not limited to, a derivatized acrylate, a derivatized polyacrylate, a derivatized urethane, a derivatized polylactide, a derivatized polyvinyl alcohol, a derivatized polylactide acrylate, a derivatized polyester, a derivatized urethane acrylate, a derivatized acrylamide, a derivatized 1,2-diol, a derivatized 1,3-diol, a derivatized urethane acrylate, a waterborne polyurethane hybrid, a derivatized poly(methylamminoethyl methacrylate), a poly(diethylaminoethyl methacrylate), poly(vinylphosphonic acid), poly(4-vinylpyridine), poly(l-vinylimidazole), poly(2-hydroxyethyl methacrylate), poly(acrylonitrile), poly(N-vinylpyrrolidone), poly(ethylene glycol dimethacrylate), divinyl sulfone, poly(ethylene glycol) diacrylate, polyacrylamide, a derivative of polyacrylamide, poly(N-isopropyl acrylamide), poly(N-hydroxy methacrylamide), poly(2-acrylamidoglycolic acid), polyacrylic acid, a derivative of polyacrylic acid (e.g., polymethacrylic acid), and any combination thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds. As used herein, the term "waterborne polyurethane hybrid," and grammatical variants thereof, refers to an emulsified material having a substance of interest that can be released upon surface interaction or chemical interaction, and is a hybrid of polyurethane and another polymer (e.g., an acrylic polymer). In some embodiments, the derivatized hydrophilic polymer comprises at least one allyl group, at least one carboxylate group, or a combination of at least one allyl group and at least one carboxylate group.

The derivatized hydrophilic polymer may be included in any amount suitable for coupling with the coupling agent and forming the bPCPPs described herein. In some embodiments, the derivatized hydrophilic polymer is included in an amount of about 0.1% to about 100% by weight of the proppant that has been modified to form the bPCPPs, encompassing any value and subset therebetween. For example, the derivatized hydrophilic polymer may be included in an amount of from about 0.1% to about 1%, or about 1% to about 10%, or about 10% to about 20%, or about 20% to about 40%, or about 40% to about 60%, or about 60% to about 80%, or about 80% to about 100%, or about 10% to about 90%, or about 20% to about 80%, or about 30% to about 70%, or about 40% to about 60% by weight of the proppant that has been modified to form the bPCPPs, encompassing any value and subset therebetween. Each of these values is critical to the embodiments described herein and depends on a number of factors including, but not limited to, the type of proppant selected, the type of silane coupling agent selected, the type of derivatized hydrophilic polymer selected, the desired functionality of the bPCPPs, and the like, and any combination thereof.

The treatment fluids comprising the bPCPPs of the present disclosure include, but are not limited to, fresh water, saltwater (e.g., water containing one or more salts dissolved therein), brine (e.g., saturated salt water), seawater, produced water (e.g., water produced as a byproduct from a subterranean formation during hydrocarbon production), waste water (e.g., water that has been adversely affected in quality by anthropogenic influence) that is untreated or treated, and any combination thereof. Generally, the water may be from any source, provided that it does not contain components that might adversely affect the stability and/or performance of the treatment fluids. Suitable aqueous-miscible fluids may, in some embodiments, include, but not be limited to, an alcohol (e.g., methanol, ethanol, n-propanol, isopropanol, n-butanol, sec-butanol, isobutanol, and t-butanol), a glycerin, a glycol (e.g., polyglycols, propylene glycol, and ethylene glycol), a polyglycol amine, a polyol, any derivative thereof, any in combination with a salt (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid described above, and any combination thereof.

In some embodiments, the treatment fluids comprising the bPCPPs further comprise a metal crosslinker capable of crosslinking the bPCPPs to further aid in their suspension in the treatment fluid. When included in a treatment fluid, the metal crosslinker include, but are not limited to, a borate ion, a metal ion, and any combination thereof. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions. In some embodiments, to facilitate crosslinking with the metal crosslinker, the derivatized hydrophilic polymer may the carboxylate groups (e.g., carboxylate end groups) as described above.

In some embodiments, the metal crosslinker may be a multifunctional boronic acid crosslinker comprising a copolymer that includes at least one boronic acid monomer unit and at least one water-soluble monomer unit. The multifunctional boronic acid crosslinker may be a random copolymer. The at least one boronic acid monomer unit may be a polymerizable vinyl, allyl, or acrylic functional group; an aryl, alkyl, alkenyl, or alkynyl boronic acid; and any combination thereof. The at least one water-soluble monomer unit may be selected from the group consisting of an acrylamide, a 2-acrylamido-2-methyl propane sulfonic acid, a N,N-dimethylacrylamide, a vinyl pyrrolidone, a dimethylaminoethyl methacrylate, an acrylic acid, a dimethylaminopropylmethacrylamide, a vinyl amine, a vinyl acetate, a trimethylammoniumethyl methacrylate chloride, a methacrylamide, a hydroxyethyl acrylate, a vinyl sulfonic acid, a vinyl phosphonic acid, a vinylbenzene sulfonic acid, a methacrylic acid, a vinyl caprolactam, a N-vinylformamide, a diallyl amine, a N,N-diallylacetamide, a dimethyldiallyl ammonium halide, an itaconic acid, a styrene sulfonic acid, a methacrylamidoethyltrimethyl ammonium halide, a quaternary salt derivative of acrylamide, a quaternary salt derivative of acrylic acid, an alkyl acrylate, an alkyl methacrylate, an alkyl acrylamide, an alkyl methacrylamide, an alkyl dimethylammoniumethyl methacrylate halide, an alkyl dimethylammoniumpropyl methacrylamide halide, any derivative thereof, and any combination thereof. For example, the boronic acid monomer unit may be 3-acrylamidophenyl boronic acid and the water-soluble monomer unit may be an acrylamide (e.g., N,N-dimethylacrylamide). In some embodiments, the ratio of the boronic acid monomer unit(s) to the water-soluble monomer unit(s) is in the range of from about 1:1 to about 1:200, encompassing any value and subset therebetween.

The metal crosslinker may be present in the treatment fluids described herein in any amount to achieve the suspension qualities. In some embodiments, the metal crosslinker is present in an amount of about 0.001% to about 1% by weight of the bPCPPs in the treatment fluid, encompassing any value and subset therebetween. For example, the metal crosslinker may be present from about 0.001% to about 0.01%, or about 0.01% to about 0.1%, or about 0.1% to about 0.2%, or about 0.2% to about 0.4%, or about 0.4% to about 0.6%, or about 0.6% to about 0.8%, or about 0.8% to about 1%, or about 0.1% to about 0.9%, or about 0.2% to about 0.8%, or about 0.3% to about 0.7%, or about 0.4% to about 0.6% by weight of the bPCPPs in the treatment fluid, encompassing any value and subset therebetween. Each of these values is critical to the embodiments of the present disclosure and depends on a number of factors including, but not limited to, the type of metal crosslinker, the composition of the bPCPPs, the viscosity of the treatment fluid, and the like, and any combination thereof.

Figure 1:
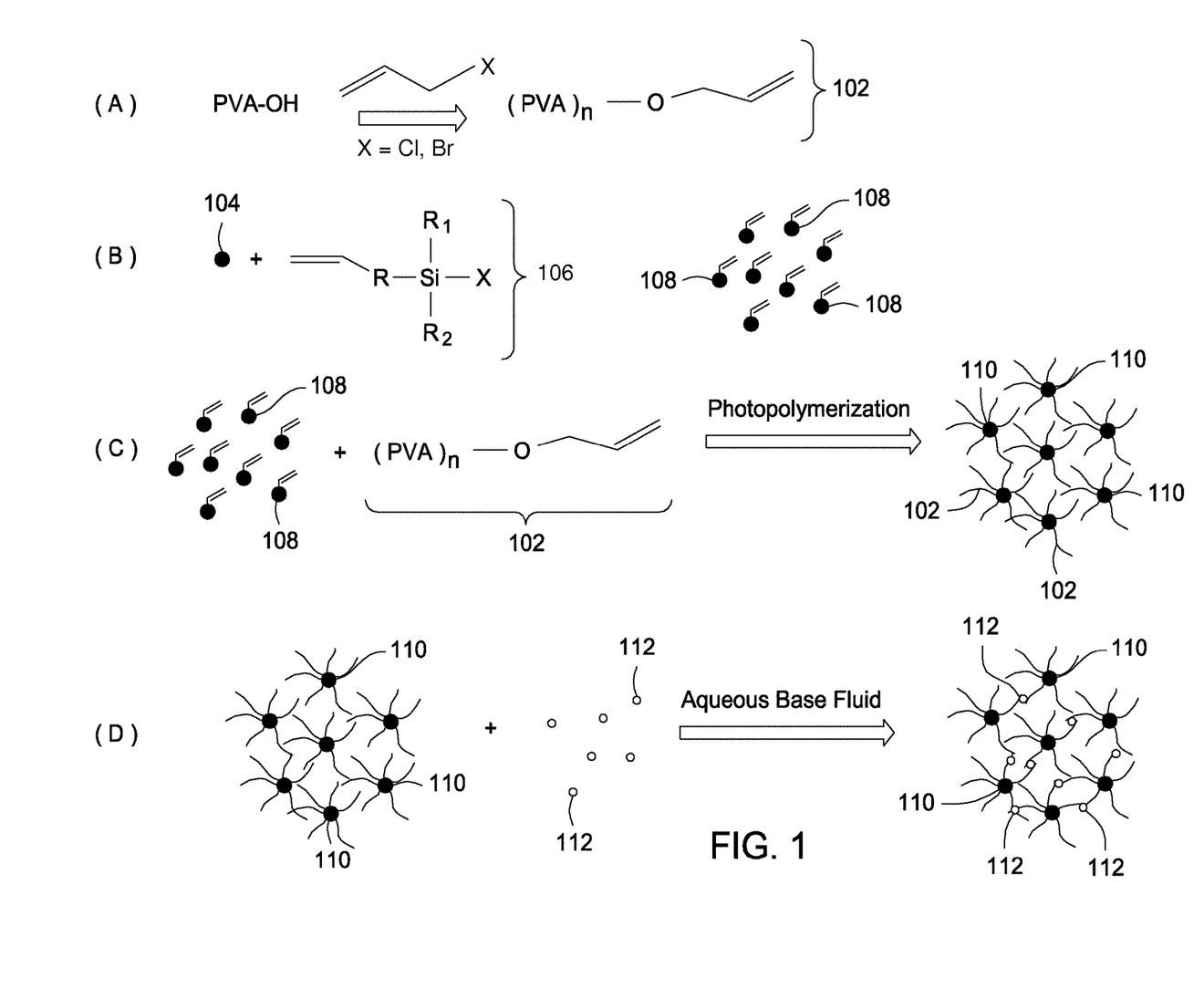
FIG. 1 is an example of a method for forming the bPCPPs, according to one or more embodiments described herein.

Referring now to FIG. 1, illustrated is an example of a method for forming the bPCPPs, according to one or more embodiments described herein. The bPCPPs formed according to FIG. 1 can advantageously crosslink in the presence of a metal crosslinker to self-suspend independent of the viscosity of the treatment fluid itself due to the particular derivatized hydrophilic polymer selected. Such self-suspension further eliminates or reduces the amount of gelling agent (e.g., gelling agent polymers) traditionally included in treatment fluids to achieve suspension because the suspension is achieved by the bPCPPs themselves and not the surrounding fluid. It will be appreciated, however, that gelling agent may be included in the treatment fluids comprising the bPCPPs described herein, without departing from the scope of the present disclosure.

As shown in FIG. 1, step (A) illustrates the formation of hydrophilic derivatized polymer 102 by derivitizing polyvinyl alcohol (PVA-OH) with an allyl chloride or an allyl bromide. Step (B), which may be performed before or after step (A) without departing from the scope of the present disclosure illustrates modification of proppant 104 by reacting the proppant 104 with a silane coupling agent 106. The X in step (A) may be a chlorine or a bromine, as shown, or may also be ethyoxy moiety or methoxy moiety. The R, $R_1$, and $R_2$ of silane coupling agent 106 may be any organofunctional group described herein, such as a methyl moiety, an ethyl moiety (e.g., an ethyl radical), a methoxy moiety, and/or an ethoxy moiety. X of silane coupling agent 106 is be an easily hydrolysable group, such as a chlorine, a methoxy moiety, or an ethoxy moiety. X may also be an ethyl or methyl moiety when one or more of R, $R_1$, and $R_2$ are a methoxy and/or an ethoxy moiety. After the reaction, modified proppant 108 is obtained comprising proppant 104 having silane coupling agent 106 reacted thereto. Step (C) illustrates the formation of bPCPPs 110 by photopolymerization of the modified proppant 108 and the hydrophilic derivatized polymer 102. As shown, the bPCPPs have a brush polymer structure where the derivatized hydrophilic polymer 102 extends from the modified proppant 108. The bPCPPs can be placed immediately into a treatment fluid and introduced into a subterranean formation as described herein. In some instances, as shown in step (D) the treatment fluid can include an aqueous base fluid, the bPCPPs 110, and a metal crosslinker 112. The metal crosslinker 112 crosslinks the bPCPPs, thereby providing suspension to the bPCPPs independent of the viscosity of the treatment fluid itself.

Figure 2:
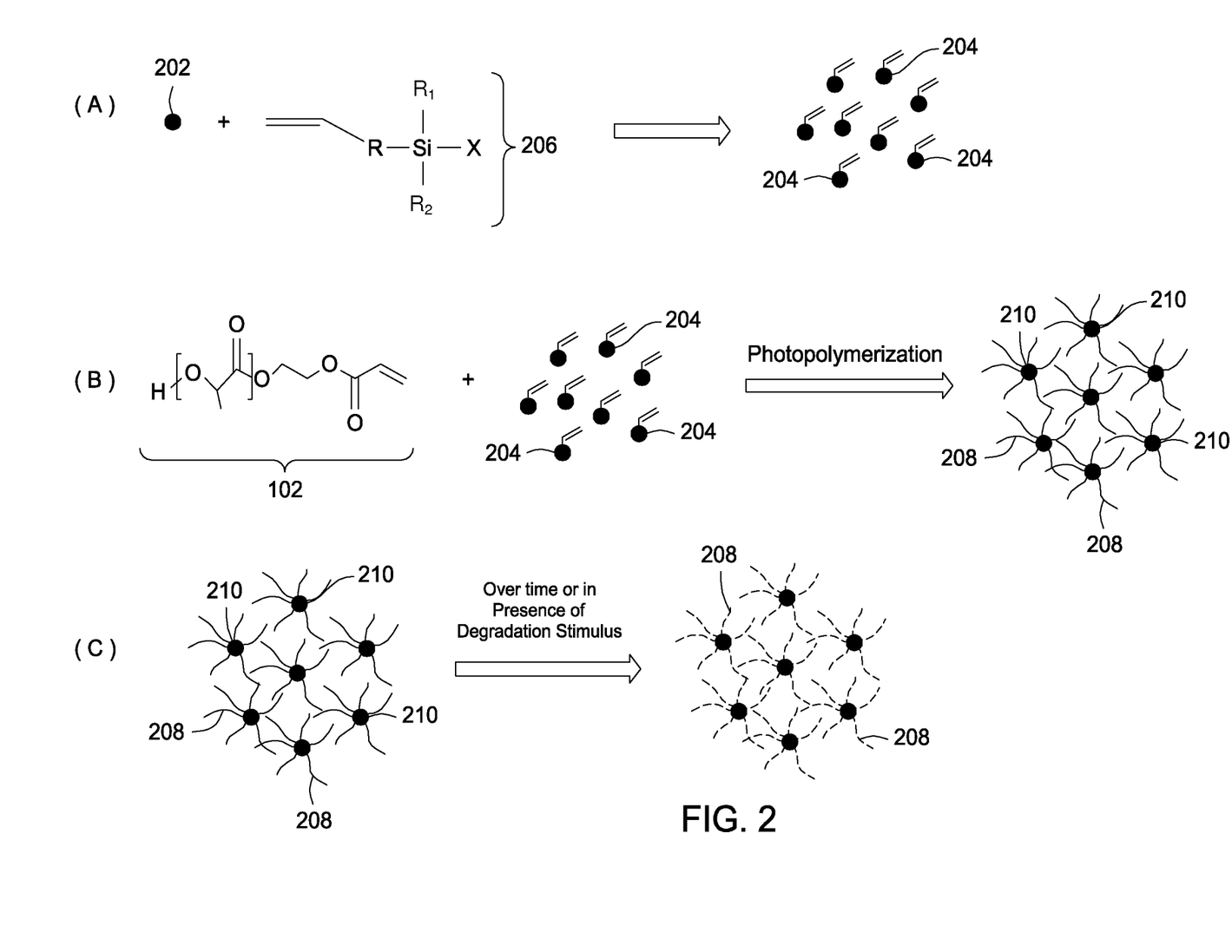
FIG. 2 is an example of a method for forming the bPCPPs, according to one or more embodiments described herein.

Referring now to FIG. 2, illustrated is another example of a method for forming the bPCPPs, according to one or more embodiments described herein. The bPCPPs formed according to FIG. 2 use a degradable derivatized hydrophilic polymer, which can be degraded downhole to increase the porosity of a proppant pack. As shown, step (A) illustrates modification of proppant 202 by reacting the proppant 202 with a silane coupling agent 206, to form modified proppant 204. R, $R_1$, and $R_2$ of silane coupling agent 206 may be any organofunctional group described herein, such as a methyl moiety, an ethyl moiety (e.g., an ethyl radical), a methoxy moiety, and/or an ethoxy moiety. X of silane coupling agent 206 is an easily hydrolysable group, such as a chlorine, a methoxy moiety, or an ethoxy moiety. Step (B) illustrates the formation of bPCPPs 210 by photopolymerization of the modified proppant 204 and the hydrophilic derivatized polymer 208, which in this example is a derivatized polylactide acrylate. As shown, the bPCPPs have a brush polymer structure where the degradable derivatized hydrophilic polymer 208 extends from the modified proppant 204. The bPCPPs can be placed into a treatment fluid and introduced into a subterranean formation to form a proppant pack as described herein. After a period of time or upon contact with a stimulus, as shown in step (C), the degradable derivatized hydrophilic polymer 208 begins to degrade (dashed lines), thereby increasing porosity of the proppant pack. Degradation may be due to a number of factors including, but not limited to, increased temperature exposure, chemical exposure (e.g., of an acid or a base), contact with produced hydrocarbon fluids, and the like, without departing from the scope of the present disclosure.

Figure 3:
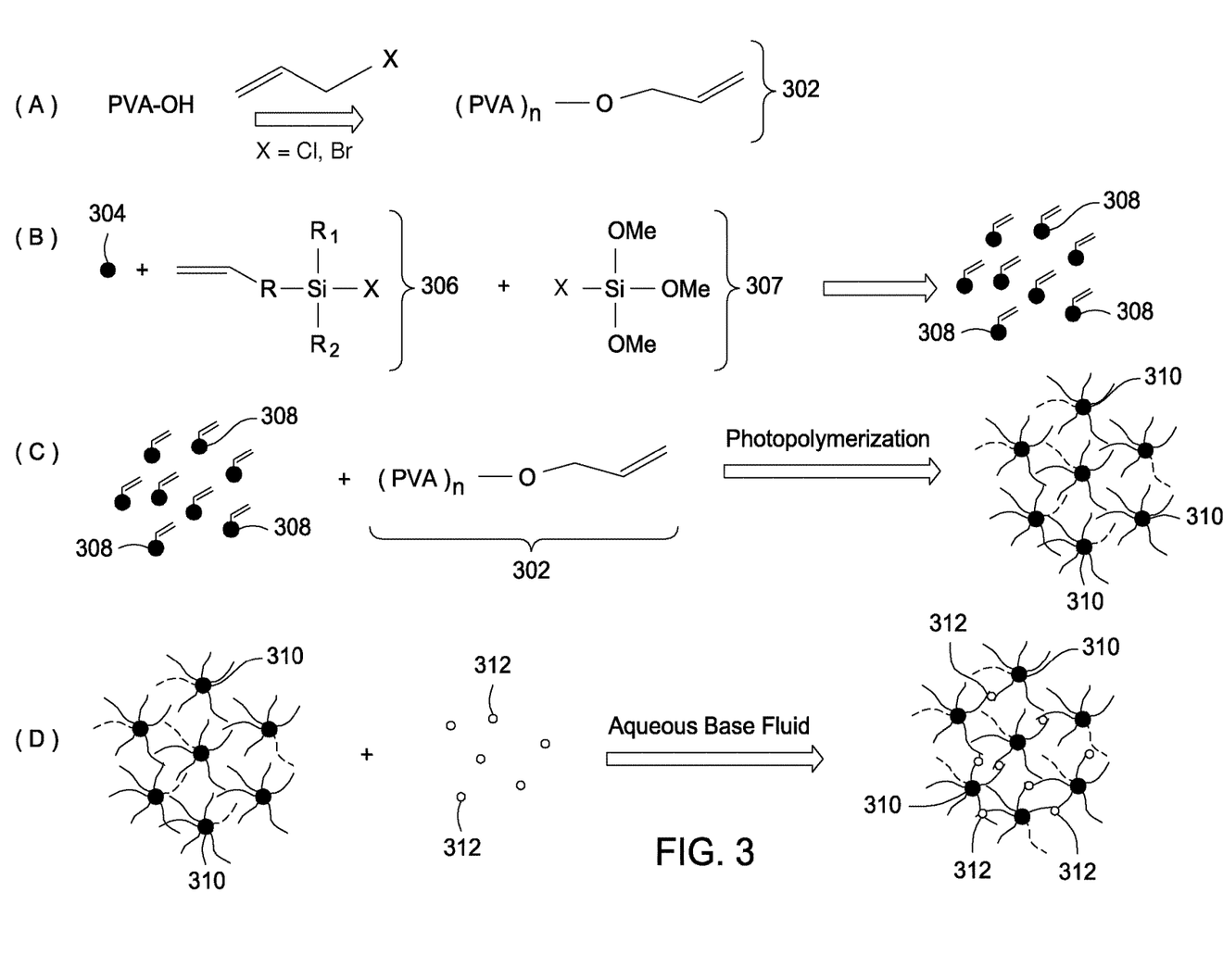
FIG. 3 is an example of a method for forming the bPCPPs, according to one or more embodiments described herein.

As mentioned above, a combination of coupling agents may be used to impart desirable qualities to the bPCPPs described herein. FIG. 3 illustrates such an example, where the bPCPPs have both the ability to crosslink in the presence of a metal crosslinker and also to provide clay stabilization, which can aid in preventing or reducing proppant embedment. As shown in FIG. 3, step (A) illustrates the formation of hydrophilic derivatized polymer 302 by derivitizing polyvinyl alcohol (PVA-OH) with an allyl chloride or an allyl bromide, which is capable of crosslinking for self-suspension. Step (B), which may be performed before or after step (A) without departing from the scope of the present disclosure illustrates modification of proppant 304 by reacting the proppant 304 with two coupling agents, a first silane coupling agent 306 and a second silane coupling agent 307. R, $R_1$, and $R_2$ of silane coupling agent 306 may be any organofunctional group described herein, such as a methyl moiety, an ethyl moiety e.g., an ethyl radical), a methoxy moiety, and/or an ethoxy moiety. X of silane coupling agent 306 is an easily hydrolysable group, such as a chlorine, a methoxy moiety, or an ethoxy moiety. X of silane coupling agent 307 is a quaternary amine group capable of imparting clay stabilization. After the reaction, modified proppant 308 is obtained comprising proppant 304 having silane coupling agent 306 and 307 reacted thereto. Step (C) illustrates the formation of bPCPPs 310 by photopolymerization of the modified proppant 308 and the hydrophilic derivatized polymer 302. As shown, the bPCPPs have a dual brush polymer structure where the derivatized hydrophilic polymer 302 extends from the modified proppant 308. The dual brush polymer structure is illustrated by the solid and dashed derivatized hydrophilic polymer 302 extensions of the bPCPPs 310. The bPCPPs can be placed immediately into a treatment fluid and introduced into a subterranean formation as described herein. In some instances, as shown in step (D) the treatment fluid can include an aqueous base fluid, the bPCPPs 310, and a metal crosslinker 312. The metal crosslinker 312 crosslinks the bPCPPs, thereby providing suspension to the bPCPPs independent of the viscosity of the treatment fluid itself.

In some embodiments, any combination of coupling agents and derivatized hydrophilic polymers can be used to form the bPCPPs described herein to impart desired qualities thereto. Such qualities may include, but are not limited to, crosslinkability for self-suspension, degradation, clay stabilization, and any combination thereof. Additional functional groups can also be added to the coupling agents and/or derivatized hydrophilic polymers to, for example, extend clay stabilization function, delay or accelerate degradation, provide wellbore strengthening, provide enhanced crush resistance, provide fines control, and the like, and any combination thereof.

In other embodiments, once the bPCPPs have been placed into at least one fracture in a subterranean formation to form a proppant pack, regardless of their particular composition (i.e., regardless of the type of coupling agent(s) and derivatized hydrophilic polymer(s) used to form the bPCPPs), a flush fluid comprising a collapsing agent may be introduced into the subterranean formation. Upon contact with the collapsing agent, the brush polymer structure is disturbed and the derivatized hydrophilic polymer collapses about the surface of the modified proppant (or simply "proppant") still having the coupling agent attached thereto, thereby resulting in collapsed cPCPPs. Due to the collapsing of the previously extended derivatized hydrophilic polymers in the brush polymer structure, the cPCPPs adopt a hydrophobic surface property. The hydrophobic nature of the cPCPPs ensures water resistivity that reduces or eliminates flow-back of the cPCPPs when additional aqueous treatment fluids are introduced into the formation. Further, the hydrophobic nature of the cPCPPs provides enhanced crush resistance to the proppant. Additionally, the contact of the coated proppant with the formation face along the fracture can significantly stabilize this interface helping to minimize embedment of the proppant into the fracture face and also helping to minimize formation fines generation and intrusion or migration into the proppant pack. Further, the hydrophobic nature of the cPCPPs can enhance oil recovery by changing surface of the rock, improved conductivity (improving permeability of proppant pack by collapsing coating that will provide additional flow path).

Figure 4:
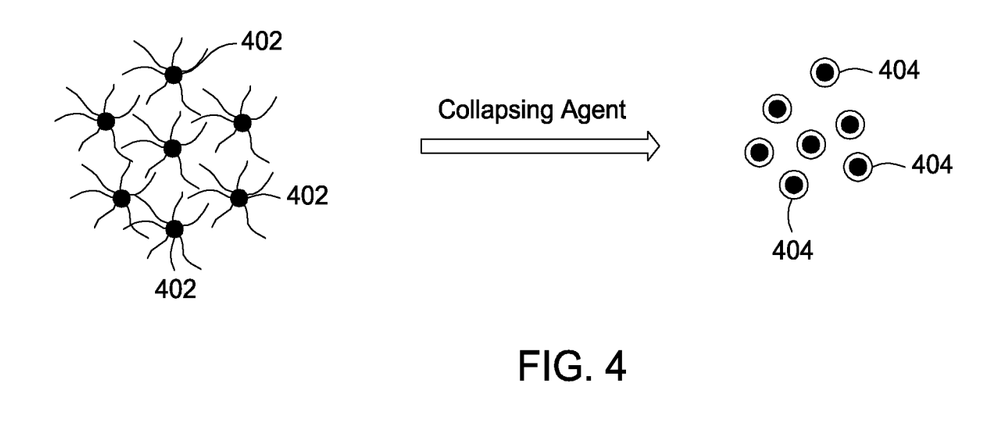
FIG. 4 is a graphical depiction of the bPCPPs collapsing to form cPCPPs upon contact with a collapsing agent in a flush fluid, according to one or more embodiments described herein.

Referring now to FIG. 4, shown is a graphical depiction of the bPCPPs collapsing to form cPCPPs upon contact with a collapsing agent in a flush fluid. As shown, bPCPPs 402 have a brush polymer structure and have a hydrophilic surface property, as described herein. Upon contact with a flush fluid comprising a collapsing agent, the brush polymer structure is disturbed and the derivatized hydrophilic polymers collapse about the outer surface of the proppant, maintaining their coupling to the coupling agent, thereby forming cPCPPs 404 having a hydrophobic surface property.

The collapsing agent may be any substance capable of disturbing the brush polymer structure of the bPCPPs to form the cPCPPs described herein. The collapsing agent may be any substance or condition, introduced or naturally occurring in a subterranean formation, resulting in elevated temperatures in contact with the bPCPPs or increased or decreased the pH of fluids contacting the bPCPPs. Accordingly, the collapsing agent may be a heat source, a pH altering substance, and any combination thereof. For example, the natural heat of a downhole formation after the proppant pack has been formed may act as a collapsing agent. In other embodiments, the temperature elevation can be achieved by introducing a heated flush fluid collapsing or a heat source collapsing into the subterranean formation to contact with the bCPPs. Other collapsing agents include acids or bases introduced into the subterranean formation in a flush fluid for contact with the bPCPPs.

The acid and base collapsing agents may be any acid or base capable of altering the pH in which the bPCPPs were previously experiencing and the selection of the pH alteration will depend on the nature of the one or more derivatized hydrophilic polymers used to form the bPCPPs. Examples of suitable acids include, but are not limited to, hydrofluoric acid, hydrochloric acid, hydrobromic acid, hydroiodic acid, hydrosulfuric acid, nitric acid, itrous acid, hypochlorous acid, chlorous acid, chloric acid, perchloric acid, sulfuric acid, sulfurous acid, phosphoric acid, phosphorous acid, carbonic acid, acetic acid, oxalic acid, boric acid, silicic acid, and any combination thereof. Examples of suitable bases include, but are not limited to, sodium hydroxide, potassium hydroxide, ammonium hydroxide, barium hydroxide, calcium hydroxide, magnesium hydroxide, aluminum hydroxide, ferrous hydroxide, ferric hydroxide, lithium hydroxide, zinc hydroxide, and any combination thereof.

As specific examples, the derivatized hydrophilic polymer forming the bPCPPs is one of a derivatized polyacrylate, a derivatized poly(methylamminoethyl methacrylate), and/or a poly(diethylaminoethyl methacrylate), and the formation of the cPCPPs therefrom is triggered by a collapsing agent that is a pH altering substance wherein disruption of the brush polymer structure to form the cPCPPs occurs below the pKa for each derivatized hydrophilic polymer. In another specific example, the derivatized hydrophilic polymer forming the bPCPPs is a derivatized polyacrylamide, and the formation of the cPCPPs therefrom is triggered by a collapsing agent that is a heat source wherein disruption of the brush polymer structure to form the cPCPPs occurs above the lower critical solution temperature of the derivatized polyacrylamide. As used herein, the term "lower critical solution" refers to the critical temperature at which stimuli responsive polymers react to environmental changes. Other collapsing agents may include, but are not limited to, pressure, light, magnetic field, electric field, solvent composition (i.e., fluid behavior), ionic strength, and any combination thereof.

In some embodiments, the treatment fluid comprising the bPCPPs of the present disclosure and/or any flush fluids used for collapsing the bPCPPs into cPCPPs may further comprise an additive including, but not limited to, a salt, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a foaming agent, a gas, a pH control additive, a breaker, a biocide, a crosslinker, a stabilizer, a chelating agent, a scale inhibitor, a gas hydrate inhibitor, a mutual solvent, an oxidizer, a reducer, a friction reducer, a clay stabilizing agent, and any combination thereof.

Figure 5:
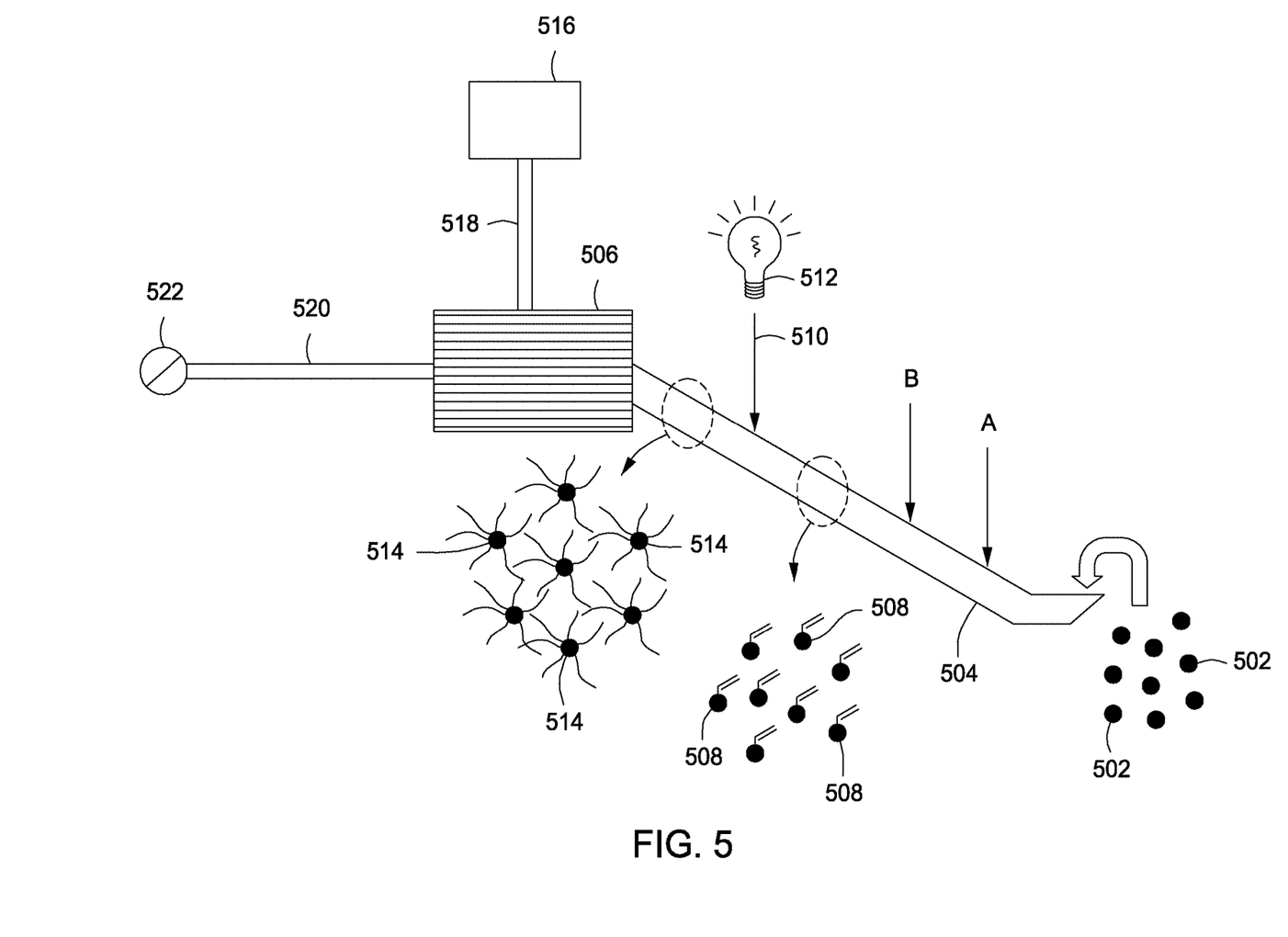
FIG. 5 is an illustrative schematic of a system for forming the bPCPPs for delivery to a downhole location, according to one or more embodiments described herein.

FIG. 5 shows an illustrative schematic of a system that can be used for forming the bPCPPs described herein for introduction to a downhole location, according to one or more embodiments of the present disclosure. As shown, proppant 502 is introduced into proppant auger 504. The proppant auger 504 may be a screw auger or other type of auger or conveyance equipment suitable for use in a subterranean formation operation that conveys proppant from a first upstream location to a second downstream location. As shown in FIG. 5, the downstream location of proppant auger 504 is blender 506. Once the proppant 502 is introduced into the proppant auger 504, the coupling agent (not shown) is added thereto at step A for modifying the proppant 504 to form modified proppant 508. The derivatized hydrophilic polymer (not shown) is added to the proppant auger 504 at step B. It will be appreciated that step B may be performed prior to step A, where the derivatized hydrophilic polymer is first added to the proppant auger 504 comprising the proppant 502 and thereafter the coupling agent is added to the proppant auger 504 comprising the proppant 502 and the derivatized hydrophilic polymer, without departing from the scope of the present disclosure.

Once the modified proppant 508 has been formed and is in the proppant auger 504 with the derivatized hydrophilic polymer, electromagnetic radiation 510 is emitted from an electromagnetic radiation source 512 to induce photopolymerization, thereby forming the bPCPPs 514. As discussed previously, the bPCPPs 514 have a brush polymer structure such that the derivatized hydrophilic polymer extends from the proppant 502. The electromagnetic radiation source 512 may be any source capable of emitting electromagnetic radiation 510 to form the bPCPPs of the present disclosure. Examples of suitable electromagnetic radiation sources 512 include devices that emit gamma rays, x-rays, infrared radiation, ultraviolet light, and/or visible light. In some instances, the composition of the bPCPPs may be selected to use readily available ultraviolet or visible light electromagnetic radiation sources 512.

Upon forming the bPCPPs 514, they are deposited into a blender 506 where they are mixed with an aqueous base fluid (not shown) from a fluid vessel 516 through a fluid conveyance 518, thereby forming a treatment fluid according to the embodiment described herein within the blender 506. Although only the fluid conveyance 518 and the proppant auger 504 are shown in fluidic communication with the blender 506 for forming a desired treatment fluid, it will be appreciated that other conveyances, connections, or openings may be used to introduce additional additives into the blender for inclusion in the treatment fluids, without departing from the scope of the present disclosure. After the treatment fluid is formed (e.g., after adequate mixing between the aqueous base fluid and the bPCPPs), a pump 522 can be used to deliver the treatment fluid through line 520 to a tubular disposed in a wellbore. Additionally, although not depicted in FIG. 5, in some embodiments, the flush fluid if used to form the cPCPPs can be formulated or housed in blender 506 and conveyed to a downhole location using pump 522 and line 520.

In various embodiments, the systems can comprise the pump 522 fluidly coupled to a tubular via line 520 (see FIG. 6 described below), the tubular containing one of the fluids described herein. The term "fluids" will be used to refer to the treatment fluid comprising the bPCPPs and any flush fluids that may be used in accordance with the embodiments described herein, unless otherwise specified. The pump 522 may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluid to a subterranean formation at or above a fracture gradient of the subterranean formation, but it may also be used in cases where fracturing is not desired. In some embodiments, the high pressure pump may be capable of fluidly conveying particulate matter, such as the bPCPPs described herein, into the subterranean formation. Suitable high pressure pumps will be known to one having ordinary skill in the art and may include, but are not limited to, floating piston pumps and positive displacement pumps.

In other embodiments, the pump 522 may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluid to the high pressure pump. In such embodiments, the low pressure pump may "step up" the pressure of the fluid before it reaches the high pressure pump.

As described, the systems described herein can comprise a blender 506 that is upstream of the pump 522 and in which the fluid is formulated. In various embodiments, the pump 522 (e.g., a low pressure pump, a high pressure pump, or a combination thereof) may convey the fluids from the blender 506 or other source of the components of the fluids to the tubular. In other embodiments, however, the fluids can be formulated offsite and transported to a worksite, in which case the fluids may be introduced to the tubular via the pump directly from its shipping container (e.g., a truck, a railcar, a barge, or the like) or from a transport pipeline. In either case, the fluids may be drawn into the pump 522, elevated to an appropriate pressure, and then introduced into the tubular for delivery downhole.

Figure 6:
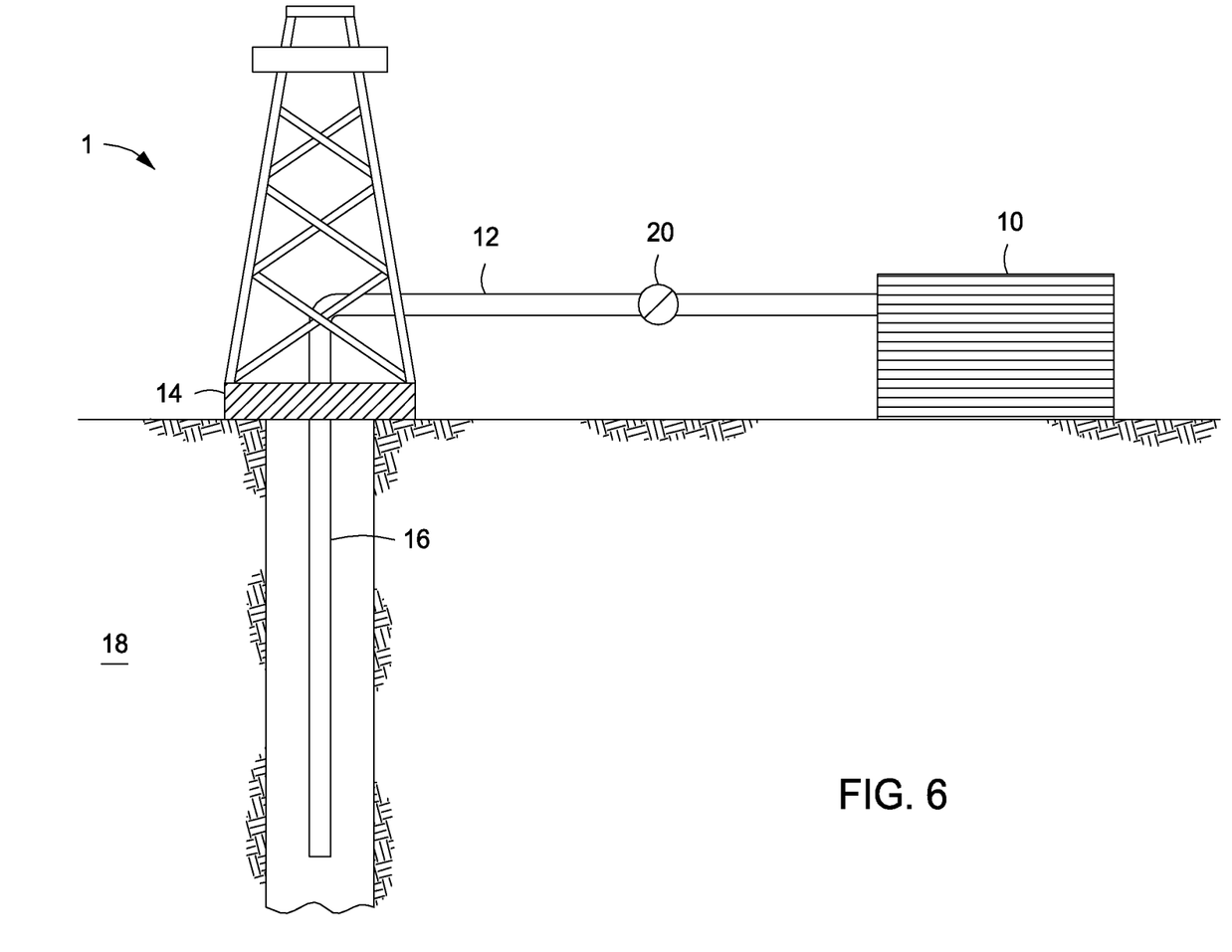
FIG. 6 is an illustrative schematic of a system for delivering the treatment fluids and/or flush fluids of the present disclosure to a downhole location, according to one or more embodiments described herein.

Referring now to FIG. 6, illustrative is a schematic of a system that can deliver the fluids of the present disclosure to a downhole location, according to one or more embodiments. While FIG. 6 generally depicts a land-based system, it is to be recognized that like systems may be operated in subsea locations as well. As depicted in FIG. 6, system 1 may include blender 10, which may be substantially similar or the same as blender 506 of FIG. 5, in which a fluid of the present disclosure may be formulated. The fluid may be conveyed via line 12, which may be substantially similar or the same as line 520 of FIG. 5, to wellhead 14, where it enters tubular 16. The tubular 16 extends from wellhead 14 into subterranean formation 18. Upon being ejected from tubular 16, the fluid may subsequently penetrate into subterranean formation 18. In some instances, tubular 16 may have a plurality of orifices (not shown) through which the fluids of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20, which may be substantially similar or the same as pump 522 of FIG. 5, may be configured to raise the pressure of the fluids to a desired degree before their introduction into tubular 16. It is to be recognized that system 1 is merely exemplary in nature and various additional components may be present that have not necessarily been depicted in FIG. 6 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 6, the fluids may, in some embodiments, flow back to wellhead 14 and exit subterranean formation 18. In some embodiments, the fluids that have flowed back to wellhead 14 may subsequently be recovered and recirculated to subterranean formation 18 or recycled and used in subsequent subterranean formation operations or non-oil and gas industry operations.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 6.

Embodiments disclosed herein include Embodiment A, Embodiment B, and Embodiment C:

Embodiment A

A method comprising: introducing a treatment fluid into a subterranean formation having at least one fracture therein, the treatment fluid comprising an aqueous base fluid and brush photopolymerized coated proppant particulates (bPCPPs), wherein the bPCPPs comprise proppant modified with a coupling agent photopolymerized to a derivatized hydrophilic polymer, thereby resulting in a brush polymer structure of the derivatized hydrophilic polymer extending from the proppant; and placing the bPCPPs into the at least one fracture to form a proppant pack therein.

Embodiment B

A method comprising: introducing a treatment fluid into a subterranean formation having at least one fracture therein, the treatment fluid comprising an aqueous base fluid and brush photopolymerized coated proppant particulates (bPCPPs), wherein the bPCPPs comprise proppant modified with a coupling agent photopolymerized to a derivatized hydrophilic polymer, thereby resulting in a brush polymer structure of the derivatized hydrophilic polymer extending from the proppant; placing the bPCPPs into the at least one fracture to form a proppant pack therein; and contacting the bPCPPs with a collapsing agent in the subterranean formation, thereby disturbing the brush polymer structure and causing the derivatized hydrophilic polymer to collapse about the proppant, thus resulting in collapsed PCPPs (cPCPPs), wherein the cPCPPs have a hydrophobic surface property.

Embodiment C

A method comprising: introducing proppant into a proppant auger; introducing a coupling agent into the proppant auger for modifying the proppant therewith; introducing a derivatized hydrophilic polymer into the proppant auger; emitting electromagnetic radiation to optically interact with the modified proppant and the derivatized hydrophilic polymer; photopolymerizing the derivatized hydrophilic monomer to the coupling agent with the electromagnetic radiation, thereby forming brush photopolymerized coated proppant particulates (bPCPPs) having a brush polymer structure such that the derivatized hydrophilic polymer extends from the proppant; combining the bPCPPs with an aqueous base fluid in a blender, thereby forming a treatment fluid; introducing the treatment fluid into a subterranean formation having at least one fracture therein; and placing the bPCPPs into the at least one fracture to form a proppant pack therein.

Each of Embodiments A, B, and C may have one or more of the following additional elements in any combination:

Element 1: Wherein the derivatized hydrophilic polymer is selected from the group consisting of a degradable derivatized hydrophilic polymer, a non-degradable derivatized hydrophilic polymer, a swellable derivatized hydrophilic polymer, and any combination thereof.

Element 2: Wherein the derivatized hydrophilic polymer is a degradable derivatized hydrophilic polymer and further comprising degrading the degradable derivatized hydrophilic polymer, thereby forming conductive channels in the proppant pack.

Element 3: Wherein derivatized hydrophilic polymer is selected from the group consisting of a derivatized acrylate, a derivatized polyacrylate, a derivatized urethane, a derivatized polylactide, a derivatized polyvinyl alcohol, a derivatized polylactide acrylate, a derivatized polyester, a derivatized urethane acrylate, a derivatized acrylamide, a derivatized 1,2-diol, a derivatized 1,3-diol, a derivatized urethane acrylate, a waterborne polyurethane hybrid, a derivatized poly(methylamminoethyl methacrylate), a poly(diethylaminoethyl methacrylate), and any combination thereof.

Element 4: Wherein the derivatized hydrophilic polymer comprises at least one allyl group, at least one carboxylate group, and any combination thereof.

Element 5: Wherein the coupling agent is a silane coupling agent.

Element 6: Wherein the coupling agent comprises at least one quaternary amine group.

Element 7: Wherein the treatment fluid further comprises a metal crosslinker.

Element 8: Further comprising a tubular extending into the subterranean formation and a pump coupled to the tubular, wherein the treatment fluid is introduced into the subterranean formation through the tubular.

Element 9: Wherein the bPCPPs are contacted with a collapsing agent in the subterranean formation, the collapsing agent selected from the group consisting of a heat source, a pH altering substance, and any combination thereof.

By way of non-limiting example, exemplary combinations applicable to A, B, C include: 1-9; 1, 3, and 9; 2 and 4; 6 and 8; 1 and 9; 3, 7, 8, and 9; 2, 3, and 5; 4 and 7; 1, 5, and 8; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    introducing a treatment fluid into a subterranean formation having at least one fracture therein, the treatment fluid comprising an aqueous base fluid and brush photopolymerized coated proppant particulates (bPCPPs),
       wherein the bPCPPs comprise a proppant coupled to a coupling agent; and wherein the coupling agent is photopolymerized to a derivatized hydrophilic monomer to provide a derivatized hydrophilic polymer that is thus coupled to the proppant via the coupling agent, thereby resulting in a brush polymer structure of the derivatized hydrophilic polymer extending from the proppant;
    placing the bPCPPs into the at least one fracture to form a proppant pack therein; and
    contacting the bPCPPs with a collapsing agent in the subterranean formation, thereby disturbing the brush polymer structure and causing the derivatized hydrophilic polymer to collapse about the proppant, thus resulting in collapsed PCPPs (cPCPPs),
       wherein the cPCPPs have a hydrophobic surface property.

2. The method of claim 1, wherein the collapsing agent is selected from the group consisting of a heat source, a pH altering substance, and any combination thereof.

3. The method of claim 1, wherein the derivatized hydrophilic polymer is selected from the group consisting of a degradable derivatized hydrophilic polymer, a non-degradable derivatized hydrophilic polymer, a swellable derivatized hydrophilic polymer, and any combination thereof.

4. The method of claim 1, wherein the derivatized hydrophilic polymer is a degradable derivatized hydrophilic polymer and further comprising degrading the degradable derivatized hydrophilic polymer, thereby forming conductive channels in the proppant pack.

5. The method of claim 1, wherein derivatized hydrophilic polymer is selected from the group consisting of a derivatized acrylate, a derivatized polyacrylate, a derivatized urethane, a derivatized polylactide, a derivatized polyvinyl alcohol, a derivatized polylactide acrylate, a derivatized polyester, a derivatized urethane acrylate, a derivatized acrylamide, a derivatized 1,2-diol, a derivatized 1,3-diol, a derivatized urethane acrylate, a waterborne polyurethane hybrid, a derivatized poly(methylamminoethyl methacrylate), a poly(diethylaminoethyl methacrylate), and any combination thereof.

6. The method of claim 1, wherein the derivatized hydrophilic polymer comprises at least one allyl group, at least one carboxylate group, and any combination thereof.

7. The method of claim 1, wherein the coupling agent is a silane coupling agent.

8. The method of claim 1, wherein the coupling agent comprises at least one quaternary amine group.

9. The method of claim 1, wherein the treatment fluid further comprises a metal crosslinker.

10. The method of claim 1, further comprising a tubular extending into the subterranean formation and a pump coupled to the tubular, wherein the treatment fluid is introduced into the subterranean formation through the tubular.

* * * * *